United States Patent [19]

Hurst et al.

[11] 4,006,050

[45] Feb. 1, 1977

[54] METHOD OF MANUFACTURING CARDS AND OTHER DOCUMENTS

[75] Inventors: Gerald Covington Hurst, Tadworth; Kenneth Adams, South Croydon, both of England

[73] Assignee: George M. Whiley Limited, Ruislip, England

[22] Filed: Feb. 7, 1975

[21] Appl. No.: 548,138

[30] Foreign Application Priority Data

Feb. 11, 1974 United Kingdom ............... 6197/74

[52] U.S. Cl. .................................. 156/234; 40/2.2; 101/369; 156/240; 156/277; 283/7; 427/148; 427/152

[51] Int. Cl.$^{2}$ ...................... B44C 1/16; B32B 31/20

[58] Field of Search ........... 40/2.2; 283/7; 101/369; 156/235, 231, 240, 233, 234, 299, 238, 277; 355/3 TR, 3 FU, 3 P; 427/148, 152; 428/914

[56] References Cited

UNITED STATES PATENTS

| | | | |
|---|---|---|---|
| 741,746 | 10/1903 | Walker | 156/299 X |
| 2,855,297 | 10/1958 | Saunders | 156/235 X |
| 2,990,278 | 6/1961 | Carlson | 355/3 TR X |
| 2,995,085 | 8/1961 | Walkup | 156/240 X |
| 3,245,697 | 4/1966 | Nugent | 283/7 |
| 3,497,411 | 2/1970 | Chebiniak | 156/234 |
| 3,545,380 | 11/1969 | Comegys et al. | 40/2.2 X |
| 3,591,276 | 7/1971 | Byrne | 355/3 TR |
| 3,620,872 | 11/1971 | Backwell | 156/238 X |

*Primary Examiner*—Douglas J. Drummond
*Assistant Examiner*—Thomas Bokan

[57] ABSTRACT

A card or other document is produced by forming by xerography an image of security matter on a transfer sheet and subsequently transferring the image to a plastics base. The security matter can be, for example, a photograph, signature or fingerprint of the intended holder of the card. The resulting card is intended to be proof against fraud to a large extent, because the image cannot be easily altered.

6 Claims, 4 Drawing Figures

METHOD OF MANUFACTURING CARDS AND OTHER DOCUMENTS

This invention relates to cards such as credit cards, identification cards, security cards and allied documents, and to their manufacture.

Credit cards and other security and identification cards issued by banks, security organisations, department stores and travellers' clubs to their customers and employees often consist of printed information protected by enclosure in a plastic lamination; the chief security means has hitherto been the addition of a layer of a matt material which the card holder is required to sign. The matt material may be applied over the top of the printed word 'cancelled' and may be of such a nature that it is easily damaged to make erasure difficult. The cards are mass produced as blanks and subsequently heavily embossed with the necessary individual matter such as the account number and name of the holder. These simple cards are the cause of much fraud by persons able either to remove the signature from stolen cards and to substitute their own, or to write a similar signature to that already on the card when they present it in exchange for goods or cash.

The present invention is concerned with the manufacture, on a similar individual basis, of, inter alia, safer plastic cards suitable for use by banks, security organisations, clubs, retailers, and even for inclusion in state documents such as passports.

The present invention involves the use of xerography. Xerography is the formulation of an image (for example a picture and/or a copy of graphic matter) by the action of light on an electrically charged photoconductive insulating surface, in which the latent image usually is developed with a powder that adheres only to those areas that remain electrically charged and in which the final image formed by the powder can, if desired, be transferred to a sheet of paper.

According to one aspect of the present invention, there is provided a card or other document which comprises (i) a base formed of a plastics material; and (ii) an image produced by xerography and subsequently transferred to at least one side of the base.

The image can be of a security nature, for example a copy of a photograph, signature or fingerprint of the person to whom the card is issued. The nature of the image is such that it cannot be easily altered, and yet the card can be cheaply and quickly produced.

The card may also include (iii) a lacquer layer on that side of the image remote from the base.

The card may additionally include a layer of printed matter between the lacquer (when present) and the image. Moreover, the card may be embossed, stamped with stamping foil, or overprinted, and may include other devices to prevent alteration.

According to another aspect of the present invention, there is provided a method of manufacturing a card or other document as defined above, which method comprises (a) forming by xerography a transferable image on a transfer sheet which sheet comprises a carrier sheet and may include a release layer and/or a lacquer layer, the formation of the image being on that side of the release layer and/or lacquer layer remote from the carrier sheet when the transfer sheet includes a release layer and/or a lacquer layer; and (b) causing the image on the transfer sheet to abut a base formed of a plastics material and causing the transference of at least the image to the base by a combination of heat and pressure so that the material of the image and the base become fused together.

When a lacquer layer is present, the lacquer layer should also be transferred during step (b) in the method to provide protection for the image on the base. The lacquer may or may not be printed with a pattern of reversed characters, or other matter, so that this also transfers on top of the image under the lacquer. Such printing may be carried out by the screen process, roto-gravure or other orthodox techniques.

When a release layer is present it generally, during step (b) of the method, splits evenly or otherwise so that part of the release composition is left on the carrier sheet and another part of the release composition is left on the lacquer (if present) or the image (if the lacquer is absent). In either case, security matter printed onto the lacquer or onto the release composition, if present, may be incorporated and will transfer to the base so that it is protected by the lacquer, if present.

The image preferably includes a reproduction of a photograph of the holder of the card or other document, and the photograph may or may not include, for example as a background, the name or device of the card-issuing organization or some other design or legend; it is hoped that this will largely reduce or eliminate the possibility of casual fraudulent use.

The image can also include, for example, a specimen of the signature of the holder, or account details of any nature.

When the image is to include a photograph of the holder, a half-tone screen consisting of a pattern of small white dots on a transparent material is preferably employed during the method. In this case, the half-tone screen pattern is just visible in reverse on the photograph and may itself include a unique design capable of recognition on closer inspection.

When the image is to include a signature, the holder should sign on a piece of paper placed on a face-upwards carbon paper so that the reverse of the signature appears on the reverse of the piece of paper. This paper may itself be printed with a design as an additional security measure. It is the reverse of the signature which is subjected to xerography so that, upon transference in step (b), the signature appears correct in the finished card or other document.

The cards or documents may be produced within a few minutes of being requested and at very low cost. For manufacture according to the above described method, only simple, readily available equipment is required, and various tests have been carried out with normal office xerographic copying machines and a simple foil stamping press.

The method of the present invention can involve the transfer of a print from a passport-sized photograph or similar image, optionally together with a signature and other security matter, or a copy of a fingerprint, to a plastic surface in such a way that it cannot be altered without destruction, and yet can be textured and embossed, leaving gaps resembling the imprint of a seal, and overprinted with any appropriate device, or embossed separately with additional data, such that substitution of the print is impractical.

The method of the present invention takes only a short time. The first stage is the production of a transferable image for a convenient number of cards, from one upwards, and requires a copying machine which works on the xerographic principle, such as a Rank Xerox Machine No. 660 made by Rank Xerox Limited. These machines produce a copy by utilising the effects of light on the dispersion of electrostatic charges and print a mixture of a powdered black pigment or dye and a thermoplastic resin which is subsequently heated to cause the resin to fuse and so to bind the pigment or dye to the surface of the paper stored in the machine. For the purposes of the present invention, the paper may be replaced by a transfer sheet as described above. The transfer sheet may be, but does not necessarily have to be, supported by being fastened to sheets of the paper normally used to receive copies.

In one embodiment of the present invention, in order to make a transferable image suitable for security use, a photograph is placed face upwards in a plastic folder, and a signature which has been reversed by being written on paper in contact with a carbon paper, or by the use of transparent plastic sheet, is positioned conveniently with any other general information or security matter as required. It may be desirable to allow some of this information to overlap the photograph or signature and any matter printed on transparent material may be placed over the photograph. A plastic screen is recommended by some machine suppliers to improve half tone reproduction and this should be placed over the photograph and other information. The dot size and pattern may be designed to provide a recognisable and unique appearance for the image. This is all enclosed in the folder and fed through the machine which has been loaded with the special transfer sheets which may or may not be overprinted in reverse with a security pattern, instead of paper. Obviously material for a number of cards for different owners may be produced at the same time. Alternatively this material may be laid in a similar order, face downwards, on a flat bed copier. The image of the surface of the combined material becomes replicated perfectly on the transfer sheet in the fusible ink. It is plain that the mirrors in the copiers can be modified to effect reversal of the image but, for identification purposes, it is not necessary to reverse the photograph. In the event that a coloured reproduction is required it is necessary to use an electrostatic copier of the type which will provide a multicoloured image.

Step (b) of the method can be effected even more quickly than step (a) and may be carried our immediately or otherwise as convenient. This requires the use of a press, for example one similar to those used for transferring stamping foils and heat transfers. The transfer sheet with image carried thereon is laid face downwards on the top of a plastic base or 'card' which may be a laminate, or a small sheet of polystyrene, polyvinyl chloride, cellulose acetate or any other thermoplastic material, and pressure and heat are applied briefly using for example either pad or a shaped block or die of metal or silicone rubber in contact with the heat source of the hot stamping press. The die, block or pad may be textured or have an overall pattern or otherwise incorporate a distinctive symbol or design to make forgery even more difficult. At this stage a further transfer, for example one of coloured foil of the type known as hot press stamping foil, or a transfer material able to record information magnetically, may be placed alongside the transfer sheet from the copier, so that they both may be transferred to the base in one operation. The base may, of course, be pre-printed on one or both sides and may be further embossed if required. If a metal die is used a temperature of 120°–140° C. is generally required, whereas if a silicone rubber die is used, it is more effective at 160°–180° C. These temperatures are approximate, higher or lower ones may be necessary on particular bases.

The actual process by which the material is transferred to the base takes less than a second, and the carrier sheet is then peeled away and discarded. The card is then complete subject to any further operation such as that described, and may be sent to the holder. If it is lost all he has to do is to request another when convenient, since it would be most difficult for anyone else to obtain credit by using the card.

If the transfer sheet incorporates a lacquer which has been overprinted with security matter, the latter, together with the lacquer, photograph and signature, fuse to a single layer and separate removal is impracticable.

The carrier sheet may be of any flat but flexible material able to withstand the moderate temperature involved and we have found a matt polyester film particularly suitable. Melinex 377 or 378 manufactured by I. C. I. Ltd., or Mylar E. B. 11 manufactured by E. I. Du Pont Inc. are examples of suitable matt polyesters; they are available in a number of thicknesses and 75 gauge (18 micron) is inexpensive and convenient to use. Glassine paper is also a satisfactory carrier sheet. This may be coated with a release composition able to accept the print, retain it under fusion conditions in the copier, yet release it completely in the heat transfer process. Such a release composition must be hard yet flexible, must melt easily and set up again slowly. Examples of such compositions are given below, (Examples 1 and 2).

It is possible to include a coloured lacquer over these compositions to add still further to the security of the card. A similar lacquer without the colouring may be used to add to the abrasion resistance and wearing properties and, by nature of its harder surface, to allow the use of a thicker and softer release coat.

An example of such a lacquer which may be dyed as described with any compatible dyestuffs is given below as Example 3.

We have found that the ink supplied with the conventional office copiers on which tests have been conducted is perfectly satisfactory and fuses very firmly to the base. In general, however, many pigments and dyestuffs may be used instead if dry milled, in a ball mill, with approximately twice their weight, the quantities are not critical, of powdered polystyrene.

EXAMPLE 1

Release coat for transfer sheet:- The following mixture was warmed and stirred until dissolved and then coated, at about two grams per square metre after drying, onto the carrier sheet, using a roller coater:-

| | |
|---|---|
| Toluene | 90 parts by weight, |
| Methyl ethyl ketone | 40 parts by weight, |
| Chlorinated paraffin wax, 70% chlorine | 20 parts by weight, and |
| Polythene Wax No. 617 manufactured by Allied Chemicals Inc. of New Jersey, U.S.A. | 2 parts by weight |

EXAMPLE 2

Release coat for carrier sheet:

In the composition of Example 1 the polythene was replaced by 'S' wax manufactured by Hoesch Limited, and 4 parts by weight of ethyl cellulose were added. 'S' wax is an acidic wax derived from coal and similar natural deposits possessing properties that make it especially suitable for use in the transference of pigmented layers. The ethyl cellulose was N 22 grade and was supplied by Hercules Powder Company Limited.

EXAMPLE 3

| | |
|---|---|
| Methyl methacrylate (Elvacite 2008 supplied by E.I. Du Pont Limited) | 100 parts by weight, |
| Methyl ethyl ketone | 500 parts by weight, and |
| Methyl cyclohexanone | 100 parts by weight |

This was applied by roller coater or rotary gravure printing at about 1½ grams per square meter, weighed after drying.

EXAMPLE 4

A release composition similar to that described in Example 1 was applied to glassine paper (paper thickness corresponded to 56 grams/sq. meter by use of a roller gravure machine having a cylinder with 160 cells per linear inch overall. A lacquer having a composition similar to that described in Example 3 was applied to the release layer in a similar manner. The lacquer was overprinted with a design, consisting of a ⅛ inch symbol repeated continuously and spaced at 5/16 inch intervals, by rotagravure. The resulting product constituted a transfer sheet.

Onto a quarto-sized piece of this transfer sheet were xerographically printed a signature, which had been prepared by writing on a piece of paper placed on top of a reversed carbon paper, and a photograph. The underside of the paper had previously been printed with a design in the form of cross-hatching. The portion of the transfer sheet to which these images (i.e., signature, photograph, and cross-hatching) had been applied was then placed over a laminated plastic credit card base, printed beneath the uppermost lamina with the name of a bank, and a moulded rubber pad heated to 160° C was brought down and held in contact with the transfer sheet by pressure from a lever, for several seconds. The moulded rubber pad was provided in one corner region with a recessed design, intended to prevent transference of material in the region of the design. The transfer sheet and the credit card base were then removed and left to cool on a flat bench under pressure. No difficulty was experienced in subsequently removing the glassine paper, so as to leave the photograph and signature, together with the overprinted design and protective lacquer, all firmly affixed to the base of the credit card. It was found that it was not possible to remove the overprinting by mechanical or chemical means without also removing the photograph.

The resulting card was then embossed with an account number in the usual way to produce a credit card virtually impossible to forge, or to present unlawfully.

For a better understanding of the present invention and to show how the same may be carried into effect, reference will now be made, by way of example, to the accompanying drawings in which.

Figure 1:
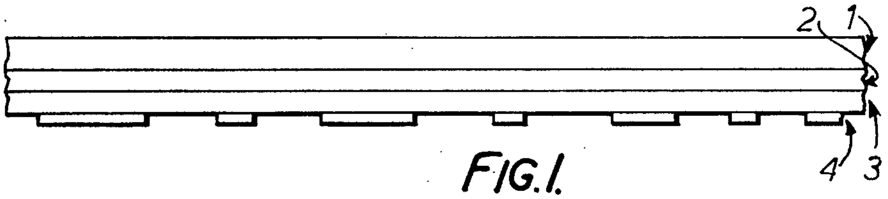
FIG. 1 represents a cross-section through a transfer sheet as employed in Example 4.

Referring firstly to FIG. 1, there is shown a carrier sheet 1, a release layer 2 provided on the carrier sheet, a lacquer layer 3 provided on the release layer, and overprinting 4 on the lacquer layer.

Figure 2:
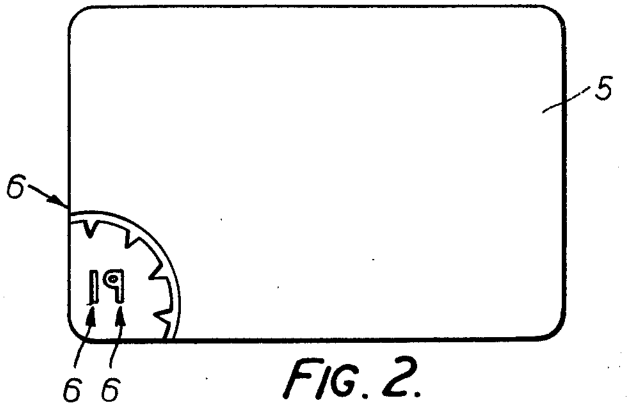
FIG. 2 shows a moulded rubber pad as used in Example 4.

In FIG. 2 there is shown a moulded rubber pad 5 having in one corner region a recessed design 6, approximately 2 mm deep.

Figure 3:
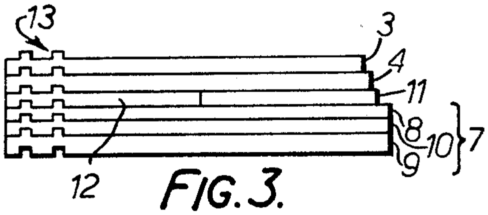
FIG. 3 is a cross-section through a credit card as produced in Example 4.

FIG. 3 shows a laminated plastics base generally indicated by the reference numeral 7 which includes two laminae 8 and 9 between which is printed material 10. The uppermost lamina 8 is transparent and the lowermost lamina 9 is also transparent. Against the lamina 8 are the xerographically produced layers representing the photograph 11 and the signature 12, and above these layers are the overprinting 4 and lacquer 3. Also shown in FIG. 3 is the embossing generally indicated by the reference numeral 13.

Figure 4:
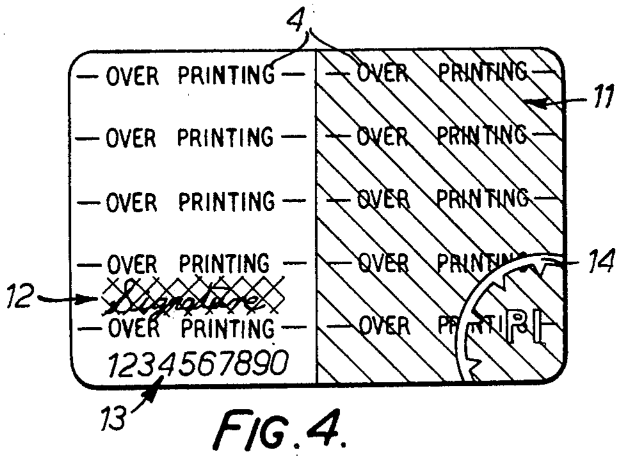
FIG. 4 is a view of the upper surface of the credit card of FIG. 3.

FIG. 4 shows the photograph 11, signature 12, overprinting 4 and embossing 13. Part 14 of the photograph 11 is omitted; this part corresponds to the region of the design 6 in the pad 5.

We claim:

1. A method of manufacturing a card or document, which comprises (a) forming by xerography a developed, transferable image of a security nature on a transfer sheet which sheet comprises a carrier sheet, a release layer adjacent to the carrier sheet and a lacquer layer on that side of the release layer remote from the carrier sheet, the formation of the image being on that side of the lacquer layer remote from the release sheet; and (b) causing the image on the transfer sheet to abut a base formed of a plastics material and causing the transference of at least the image and lacquer layer to the base by a combination of heat and pressure so that the material of the image and the base become fused together.

2. A method according to claim 1, wherein the formation of the image involves subjecting security matter selected from a photograph, a fingerprint, a signature, optionally in reverse, and a copy of any thereof, to xerography so as to form an image of a security nature.

3. A method according to claim 2, wherein, when the image is of a photograph, a half-tone screen is positioned between the photograph and the means for forming the image.

4. A method according to claim 2, wherein, when the image is of a signature, the intended recipient of the card or other document signs his name on a piece of paper placed on a face-upwards carbon paper, so that the reverse of the signature appears on the reverse of the piece of paper, and the reverse of the piece of paper is used in the formation of the image by xerography.

5. A method according to claim 1, wherein the image is formed by feeding the object from which the image is to be formed, in a transparent wrapper, into a xerographic machine.

6. A method according to claim 1, wherein the transference in step (b) is effected with a heated pad, block or die, which optionally is textured and which optionally has an overall pattern; and wherein during step (b) there is also transferred to the base an additional layer selected from a coloured foil and a material able to record information magnetically.

* * * * *